(12) United States Patent
Lee et al.

(10) Patent No.: US 7,395,595 B2
(45) Date of Patent: Jul. 8, 2008

(54) METHOD FOR MANUFACTURING P3 LAYER OF A PERPENDICULAR MAGNETIC WRITE HEAD

(75) Inventors: Kim Yang Lee, Fremont, CA (US); Jyh-Shuey Lo, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 408 days.

(21) Appl. No.: 11/110,534

(22) Filed: Apr. 19, 2005

(65) Prior Publication Data

US 2006/0232882 A1    Oct. 19, 2006

(51) Int. Cl.
*G11B 5/127* (2006.01)
*H04R 31/00* (2006.01)

(52) U.S. Cl. ............ 29/603.16; 29/603.13; 29/603.18; 29/605; 29/606; 205/122; 216/62; 216/66; 216/67; 360/122; 360/317; 430/328; 451/5; 451/41

(58) Field of Classification Search .............. 29/603.11, 29/603.16–603.18, 605, 606; 205/11, 122; 216/62, 66, 67; 360/126, 317; 430/328; 451/5, 41
See application file for complete search history.

(56) References Cited

U.S. PATENT DOCUMENTS

| 5,559,654 | A | | 9/1996 | Das |
| 6,083,410 | A | | 7/2000 | Ikegawa et al. |
| 6,096,802 | A | * | 8/2000 | Lark ............................. 523/206 |
| 6,117,622 | A | * | 9/2000 | Eisele et al. ................ 430/328 |
| 6,503,693 | B1 | * | 1/2003 | Mohondro et al. .......... 430/328 |
| 6,511,794 | B1 | * | 1/2003 | Furukawa .................... 430/328 |
| 2002/0079057 | A1 | | 6/2002 | Yoshioka et al. |
| 2002/0084243 | A1 | | 7/2002 | Hsiao et al. |
| 2003/0179497 | A1 | | 9/2003 | Harris, III et al. |
| 2004/0001282 | A1 | | 1/2004 | Dinan et al. |

OTHER PUBLICATIONS

Xiaomin Yang and Harold Gentile, Shrink Assist Film for Enhanced Resolution (SAFIER™) Process for Printing of 20 nm Trenches with High Aspect Ratio, Emerging Lithographic Technologies VIII edited by R. Scott Mackay, Proceedings of SPIE vol. 5374, SPIE, Bellingham, WA, 2004.

* cited by examiner

*Primary Examiner*—Paul D Kim
(74) *Attorney, Agent, or Firm*—Law Offices of Imam

(57) ABSTRACT

A method for forming a P3 layer with NiFe and alumina mask using resist shrink process for use in perpendicular magnetic write heads. The method includes forming a laminated layer, forming an alumina layer on top of the laminated layer, depositing a conductive layer onto the laminated layer, forming a plating frame on a gap layer. The plating frame has a trench defined by plating track, the alumina, laminated and conductive layers each including an area below the trench. The method further includes shrinking the trench, plating NiFe into a portion of the shrunk trench, stripping the plating frame, removing the conductive layer except the conductive layer formed below the trench, removing the alumina layer except the alumina layer formed below the trench, removing the laminated layer except the laminated layer formed below the trench and patterning the laminated layer formed below the trench.

20 Claims, 10 Drawing Sheets

METHOD FOR MANUFACTURING P3 LAYER OF A PERPENDICULAR MAGNETIC WRITE HEAD

BACKGROUND OF THE INVENTION

1. Field of the Invention

This invention relates generally to the field of perpendicular magnetic recording (or write) heads having a P3 magnetic layer and more particularly, to an improved method of fabricating the P3 magnetic layer resulting in small track width.

2. Description of the Prior Art

As the recording density of magnetic hard drives (or disc drives) increases, a physical limitation is experienced using longitudinal recording systems partly due to thermal relaxation known as super-paramagnetism. That is, the density requirements for meeting today's storage needs are simply not attainable with longitudinal recording systems. To provide further insight into this problem, it is anticipated that longitudinal recording systems will lose popularity as storage capacities in excess of about 150 Gigabytes-per-square-inches become a requirement. These and other factors have lead to the development and expected launch of perpendicular recording heads or write heads. Perpendicular recording is promising in pushing the recording density beyond the limit of longitudinal recording.

Accordingly, perpendicular recording potentially can support much higher linear density than longitudinal recording due to lower demagnetizing fields in recorded bits, which diminish when linear density increases.

A magnetic recording head for perpendicular writing generally includes two portions, a write head portion or head for writing or programming magnetically-encoded information on a magnetic media or disc and a reader portion for reading or retrieving the stored information from the media.

The write head or recording head of the magnetic head or disc drive for perpendicular recording typically includes a main pole and a return pole which are magnetically separated from each other at an air bearing surface (ABS) of the writer by a nonmagnetic gap layer, and which are magnetically connected to each other at a region distal from the ABS at a back gap closure (yoke). This structure is a single-pole write head because while a main pole and return pole are referred thereto, the return pole is not physically a pole, rather, it serves to close the loop with the main pole and the soft under layer for magnetic flux circuit.

Positioned at least partially between the main and return poles are one or more layers of conductive coils encapsulated by insulation layers. The ABS is the surface of the magnetic head immediately adjacent to the perpendicular medium.

To write data to the magnetic medium, an electrical current is caused to flow through the conductive coil, thereby inducing a magnetic field across the gap between the main and return poles. By reversing the polarity of the current through the coil, the polarity of the data written to the magnetic media is also reversed.

The goal with perpendicular write heads is to reduce the size of various components or structures thereof, such as what is commonly known as the P3 region or layer. By doing so, undesirable erasure of adjacent tracks during write operations is reduced or eliminated. Currently, photoresist techniques, such as the well known method of Dumedi is used for forming P3 layers but causing undesirable changes to dimensions during the process therefore causing difficulty in controlling the track width. Thus, a narrow P3 layer construction is nearly impossible with known techniques. Also, plating thickness is limited with the Dumedi technique. Moreover, consistent track widths are unattainable, particularly, across wafers.

Therefore, the need arises for a write head employed in perpendicular recorders or disc drives having a P3 layer that is formed in a way so as to reduce its size and therefore smaller track width and avoid or minimize undesirable erasure of adjacent tracks during write operations.

SUMMARY OF THE INVENTION

Briefly, a method for manufacturing P3 layer for use in a perpendicular magnetic write head is disclosed in accordance with one embodiment of the present invention. The method includes forming a laminated layer, forming an alumina layer on top of the laminated layer, depositing a conductive layer onto the laminated layer, forming a plating frame on a gap layer. The plating frame has a trench defined by plating track, the alumina, laminated and conductive layers each including an area below the trench. The method further includes shrinking the trench, plating NiFe into a portion of the shrunk trench, stripping the plating frame, removing the conductive layer except the conductive layer formed below the trench, removing the alumina layer except the alumina layer formed below the trench, removing the laminated layer except the laminated layer formed below the trench and patterning the laminated layer formed below the trench.

IN THE DRAWINGS

FIGS. 5 through 15, show a method for constructing or fabricating the P3 magnetic layer 438 of the write head 408 or other magnetic structure according to an embodiment of the present invention will be described.

DETAILED DESCRIPTION OF THE PREFERRED EMBODIMENT

The following description is the best embodiment presently contemplated for carrying out this invention. This description is made for the purpose of illustrating the general principles of this invention and is not meant to limit the inventive concepts claimed herein.

Figure 1:
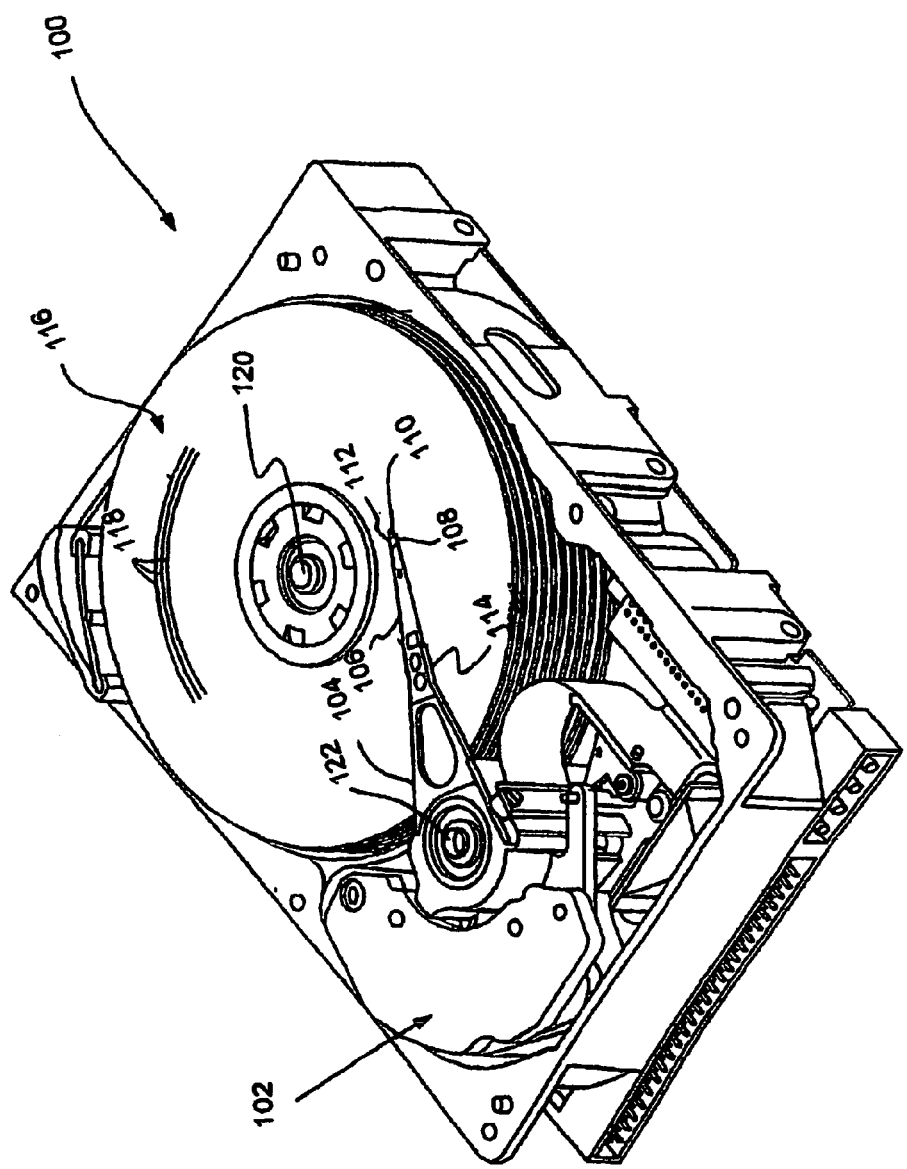
FIG. 1 shows a top perspective view of a disc drive 100 embodying this invention in accordance with an embodiment of the present invention.

Referring now to FIG. 1, a top perspective view of a disc drive 100 dembodying this invention is shown in accordance with an embodiment of the present invention. The disc drive 100 is shown to include a voice coil motor (VCM) 102, an actuator arm 104, a suspension 106, a flexure 108, a slider 110, a read-write (perpendicular) head 112, a head mounting block 114, and magnetic disc or media 116. Suspension 106 is connected to the actuator arm 104 at the head mounting block 114. The actuator arm 104 is coupled to the VCM 102. The disc 116 includes a plurality of tracks 118 and rotates about axis 120. The tracks 118 are circular, each extending circularly around the surface of the disc 116 for storing magnetically-encoded data or information using the perpendicular head 112, which will be discussed in greater detail with respect to further figures.

During operation of the disc drive 100, rotation of the disc 116 generates air movement which is encountered by the slider 110. This air movement acts to keep the slider 110 afloat a small distance above the surface of the disc 116, allowing the slider 110 to fly above the surface of the disc 116. The VCM 102 is selectively operated to move the actuator arm 104 around the axis 120, thereby moving the suspension 106 and positioning the transducing head (not shown), which includes a main pole (not shown), by the slider 110 over the tracks 118 of the disc 116. It is imperative to position the transducing head properly to read and write data from and to the concentric tracks 118.

Figure 2:
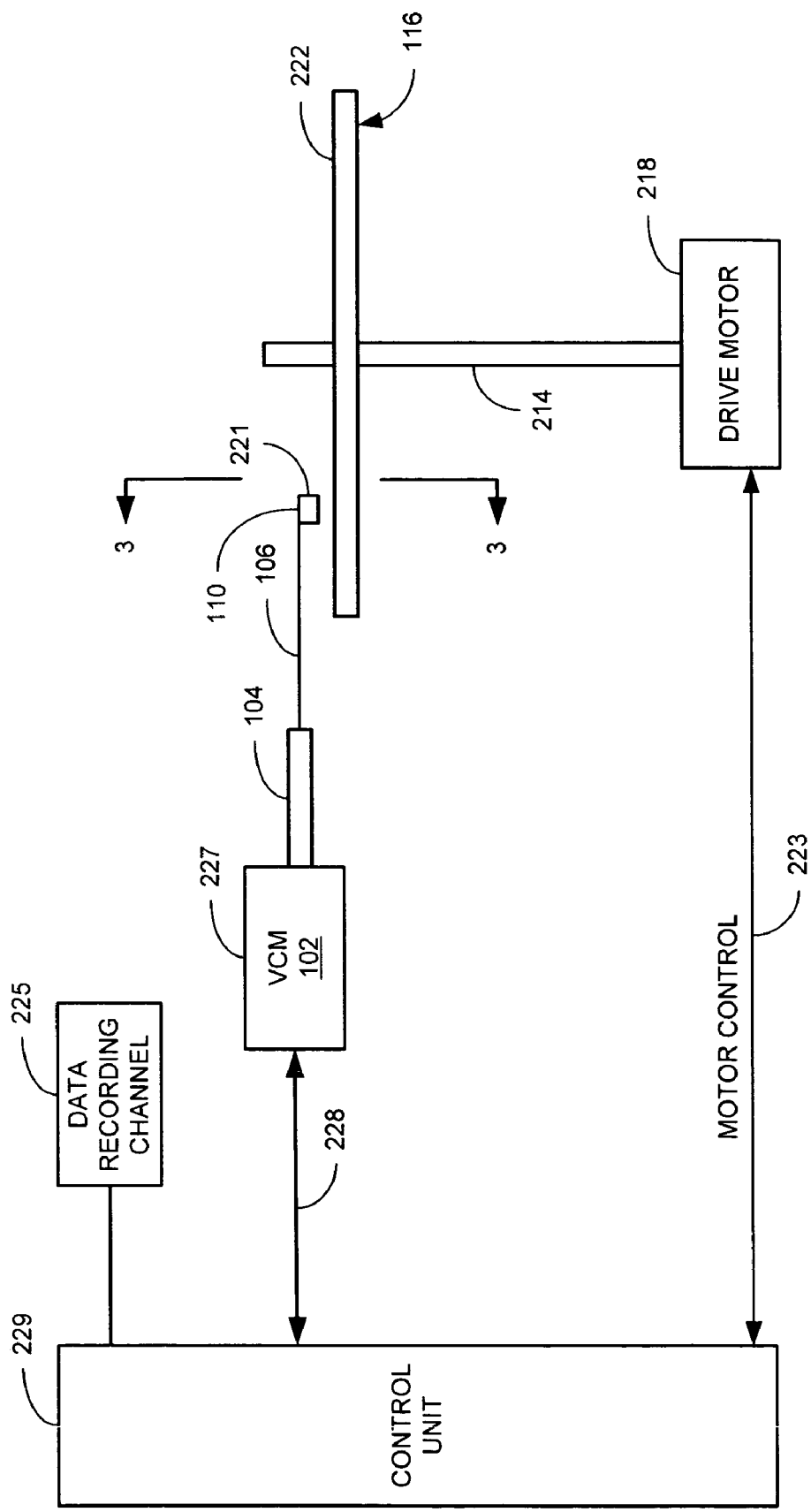
FIG. 2 shows further structures of the disc drive 100 in accordance with an embodiment of the present invention.

With reference now to FIG. 2, further structures of the disc drive 100 are shown in accordance with an embodiment of the present invention. As shown in FIG. 2, at least one rotatable magnetic disc 116 is supported on a spindle 214 and rotated by a disc drive motor 218. The magnetic recording on each disc is in the form of an annular pattern of concentric data tracks (not shown in FIG. 2) on the disc 116.

At least one slider 110 is positioned near the magnetic disc 116, each slider 110 supporting one or more magnetic head assemblies 221. As the magnetic disc rotates, the slider 110 is moved radially in and out over the disc surface 222 so that the magnetic head assembly 221 may access different tracks of the magnetic disc where desired data are written. Each slider 110 is attached to the actuator arm 104 by way of a suspension 106. The suspension 106 provides a slight spring force which biases slider 110 against the disc surface 222. Each actuator arm 104 is attacahed to an actuator means 227. The actuator means 227, as shown in FIG. 2, may be the VCM 102. The VCM 102 comprises a coil movable within a fixed magnetic field, the direction and speed of the coil movements being controlled by the motor current signals supplied by the controller 229.

During operation of the disc storage system or disc drive 100, the rotation of the disc 116 generates an air bearing between the slider 110 and the disc surface 222 which exerts an upward force or lift on the slider. The air bearing thus counter-balances the slight spring force of the suspension 106 and supports the slider 110 off and slightly above the disc surface by a small, substantially constant spacing during normal operation.

The various components of the disc storage system are controlled in operation by control signals generated by the control unit 229, such as access control signals and internal clock signals. Typically, the control unit 229 comprises logic control circuits, storage means and a microprocessor. The control unit 229 generates control signals to control various system operations such as drive motor control signals on line 223 and head position and seek control signals on line 228. The control signals on line 228 provide the desired current profiles to optimally move and position slider 110 to the desired data track on the disc 116. Write and read signals are communicated to and from write and read heads 221 by way of recording channel 225.

The above description of a typical magnetic disk storage system, and the accompanying illustration of FIG. 2 are for representation purposes only. It should be apparent that disc storage systems may contain a large number of discs and actuators, and each actuator may support a number of sliders. It should be noted that the term "disc", as used herein, is the same as the term "disk", as known to those of ordinary skill in the art, in fact, the terms "disc" and "disk" are used interchangeably.

Figure 3:
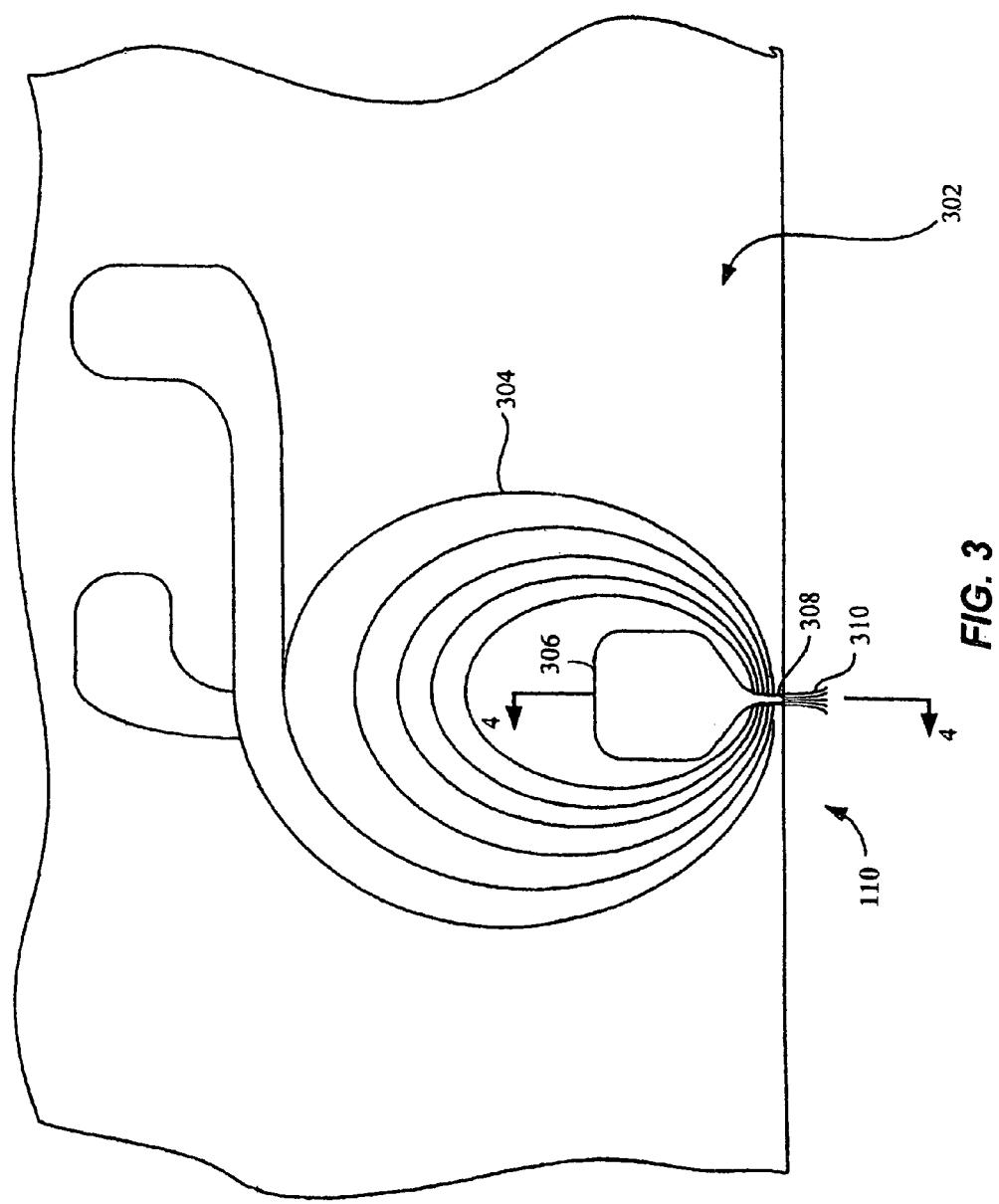
FIG. 3 illustrates a plan view of an exemplary write element 302 that can be seen in relation to the slider 110.

This invention provides a method of improving the fabrication of a portion of the write head. With reference to FIG. 3, a plan view of an exemplary write element 302 can be seen in relation to the slider 10. A coil 304, passing through a magnetic yoke 306, induces a magnetic flux in the yoke 306. The magnetic flux in the yoke 306, in turn causes a magnetic field to fringe out at the pole tip 308. It is this fringing field 310 that writes magnetic signals onto a nearby magnetic medium.

Figure 4:
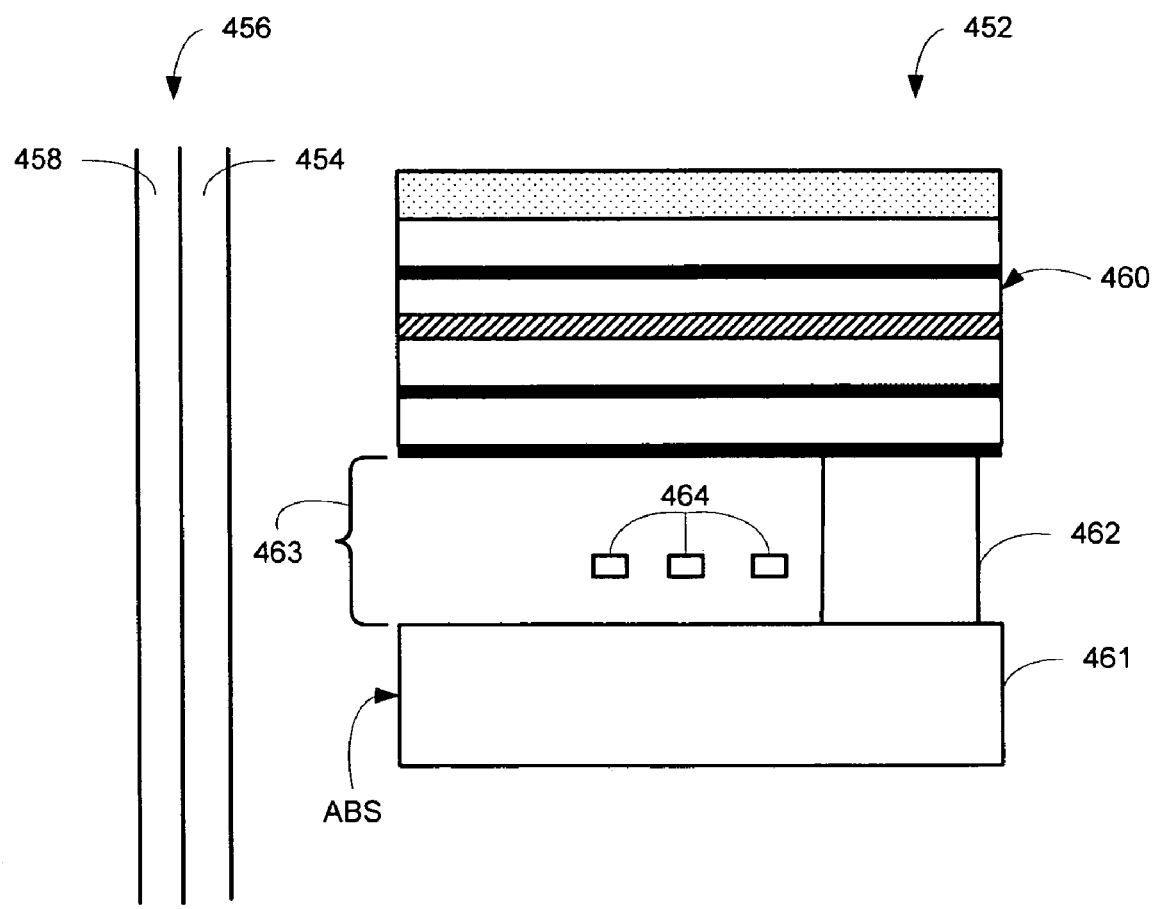
FIG. 4 shows a cross-sectional view of an embodiment of the perpendicular write head 452 in accordance with an embodiment of the present invention.

With reference now to FIG. 4, a cross-sectional view of an embodiment of the perpendicular write head (or recorder) 452 is shown in accordance with an embodiment of the present invention. The disc (or medium) 456 utilized by perpendicular recorders generally includes a thin storage layer 454 having high coercivity and perpendicular anisotropy (the magnetization is held in a direction substantially normal to the surface of the disc 456) and a soft magnetic underlayer or keeper 458 having high permeability.

The write head 452 comprises a main pole 460, a return pole 461, connected to each other by a back gap closure 462 at a distal end and separated from each other by a gap 463 at the ABS and write coil 464 positioned between the main pole 460 and the return pole 461.

Magnetization transitions on the disc 456 are recorded by the main pole 460. The main pole 460 has submicron width at the ABS to provide recording of ultra-narrow tracks on the disc 456. Futhermore, the proposed structure of the main pole 460 decreases remnant field in the media as well as coil current for saturation field thereby reducing undesirable data erasures, faster write performance and a reduction in mechanical failures due to the lack of need for high current.

To write data to the perpendicular magnetic disc (or medium) 456, a time-varying write current is caused to flow through the coil 464, which in turn produces a time-varying magnetic field through the main pole 460 and the return pole 461. The disc 4566 is then passed by the ABS of the recorder 452 at a predetermined distance such that the disc 456 is exposed to the magnetic field. An embodiment of the present invention includes structure(s) for and method(s) of fabrication of the coil 464, which is typically made of copper.

A closed magnetic path for flux from the recorder 452 to the disc 456 travels from the main pole 460, through the storage layer 454 of the disc 456 to the soft magnetic keeper 458 and returns to the recorder 452 through the return pole 461, again passing through the storage layer 454. To ensure that the magnetic field does not write data on the return path, while not obvious in FIG. 4, the surface area of the return pole 461 at the ABS is generally substantially larger than the surface area of the main pole 460 at the ABS. Thus, the strength of the magnetic field affecting the storage layer 454 under the return pole 461 will not be sufficient to overcome a nucleation field of the storage layer 454.

Additionally, while the layers of the main pole 460 are illustrated as planar layers, it is contemplated that they may follow other contours. Furthermore, the illustrations are not rendered to scale, as noted hereinabove. The main pole 460 is shown to have a multi-layer structure, however, a single layer main pole is contemplated. The main pole 460 is made of a P3 magnetic layer (not shown) fabricated in accordance with the various methods discussed herein.

With reference to FIGS. 5 through 15, a method of constructing or fabricating the P3 layer of the write head 452 or other magnetic structure according to an embodiment of the present invention will be described.

Figure 5:
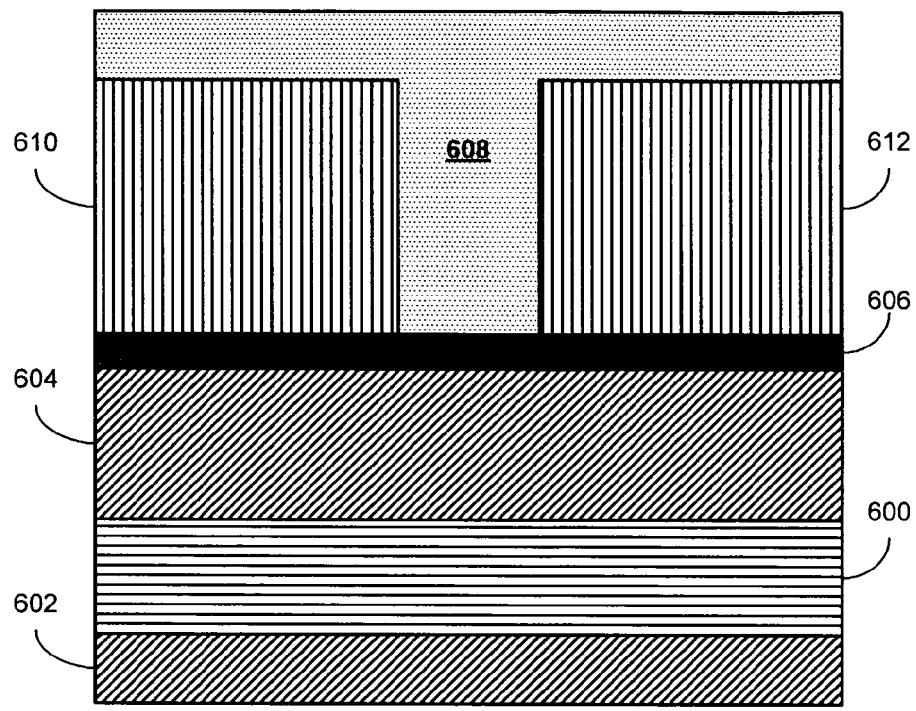

With particular reference to FIG. 5, a high moment laminated layer 600 is shown laminated between two aluminum layers 602 and 604. The laminated layer 600 forms what is commonly referred to and known as the main pole of the write head in disc drive. The layer 600 is preferably made of a laminated magnetic material of high saturation moment, such as Nickel Iron (NiFe), Cobolt Iron (CoFe) or Cobolt Nickel Iron (CoNiFe) laminated with Rhodium (Rh), Ta or alumina ($Al_2O_3$). The layer 600 is typically 0.1 to 0.5 microns in thickness.

The layer 602, onto which the layer 600 is deposited, is a non-magnetic insulator layer, preferably made of Aluminum Oxide ($Al_2O_3$) and the layer 604, which is deposited onto the layer 600 is preferably also a non-magnetic insulator layer made of $Al_2O_3$ with a thickness of approximately 0.5 to 0.8 microns. The layer 602 is generally an insulation layer having non-magnetic and non-metal characteristics. The layer 604 is typically anywhere from 0.1 to 1.5 microns in thickness. The layer 604 acts as an alumina mask when processing the layer 600 to hold the dimensions of the layer 600 in place so as not to change the dimensions during the process of construction of the P3 layer.

The conductive layer 606 is deposited onto the layer 604 and is preferably 200 Angstroms in thickness, but can be within the range of 100-1000 Angstroms, and in an exemplary embodiment is made of Tedium Rhodium material. Alternatively, Rudisium (Ru) may be employed to form the layer 606. The layer 606 needs to be of a material that withstands or survives CMP and not dissolve in a plating solution.

The layer 606 serves as a conductor or seed layer, as will be discussed shortly. The plating frame is formed of two plating frame layers, 610 and 612 and is solvent dissolvable. The layers 610 and 612 are formed onto the layer 606 and deep ultraviolet photolithography is preferably used to expose the layers 610 and 612, as the latter is solvent dissolvable. Safier, which is water dissolvable, is used to coat the plating frame layers 610 and 612. Techniques other than deep ultraviolet may be employed for exposure, examples of which are I-line and e-beam photolithography. The areas between the layers 610 and 612 and on top thereof form a plating trench 608. Safier, which is a water soluble polymer, is used to fill the trench 608.

Figure 6:
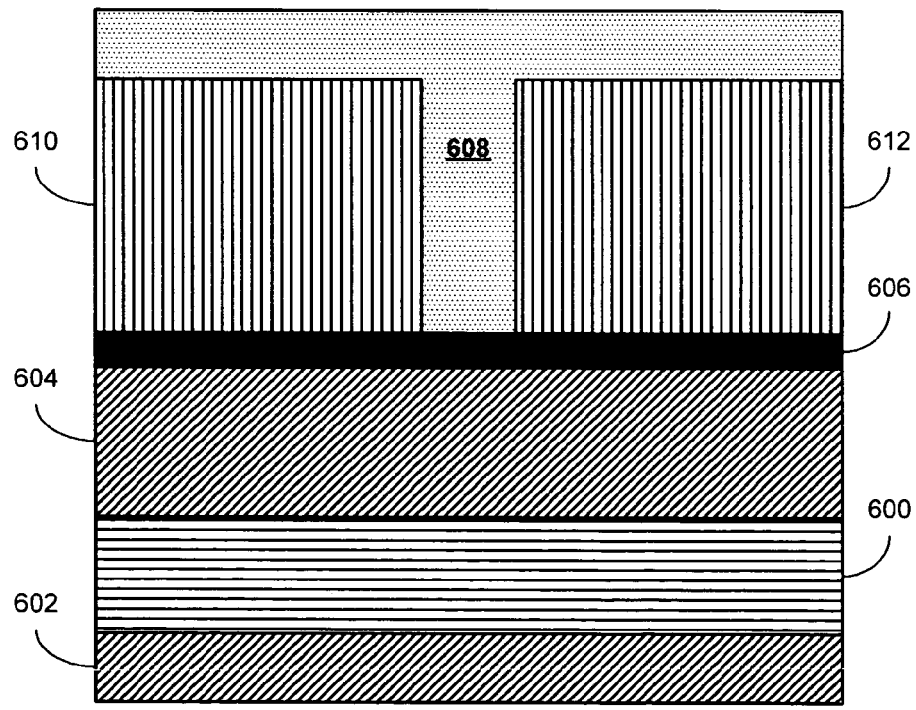

Next, as shown in FIG. 6, a resist shrinking process is performed wherein the structure of FIG. 5 is baked at 130 degrees Celsius for approximately 0.5 to three minutes causing the plating frame or trench to shrink.

Figure 7:
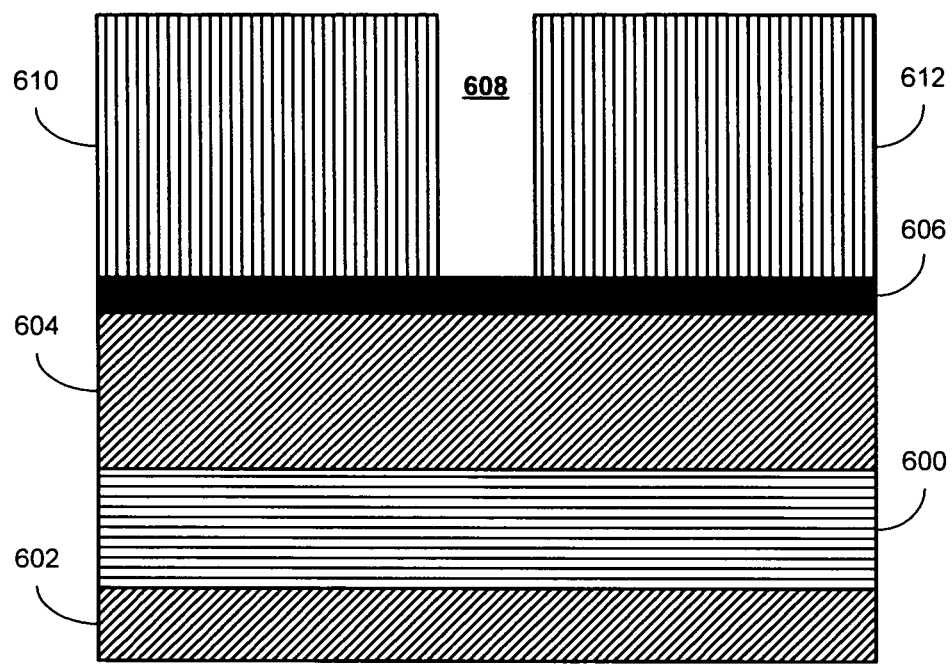
Figure 8:
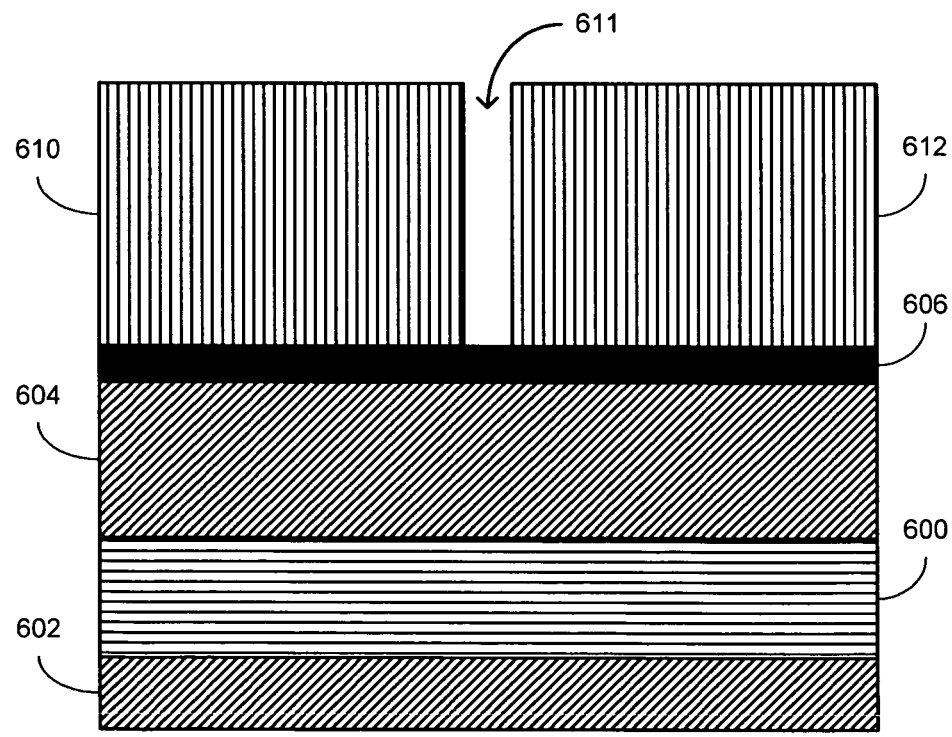

Next, in FIG. 7, water is used to dissolve the Safier in the frame 608 thereby removing the Safier, as the latter is water soluble. In FIG. 8, the processes of depositing or sprinkling Safier onto the frame 608, baking and removing the Safier by water dissolving the same are repeated and during each repetition, the area between the layers 610 and 612, is shrunk further to define the trench 611. The number of repetitions is as many repetitions as it takes for the trench 611 to become approximately 0.15 to 0.3 microns in width, as desired.

Figure 9:
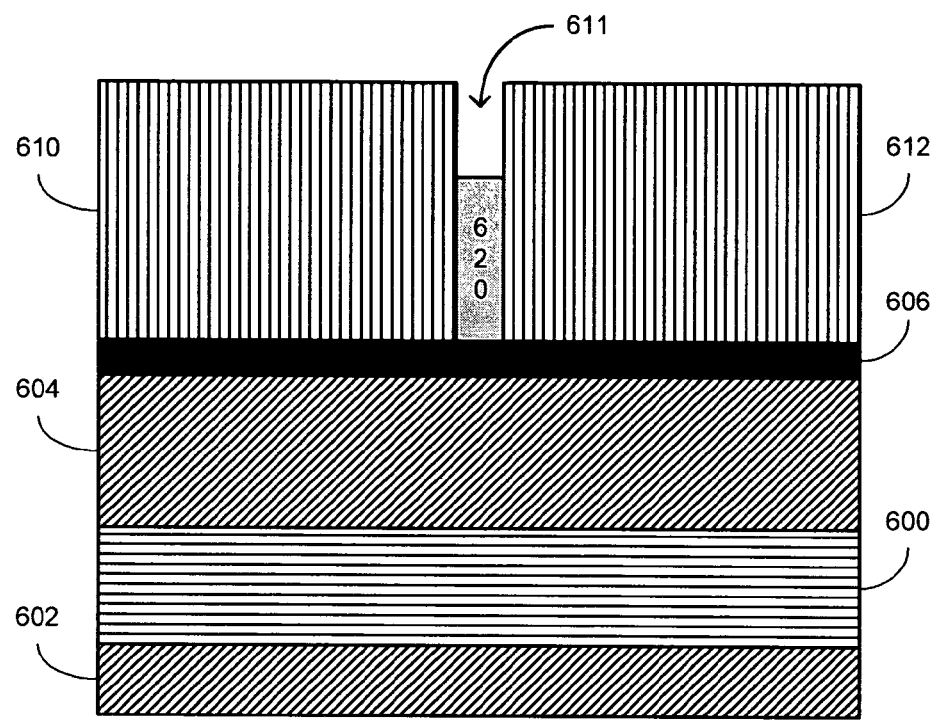
Figure 10:
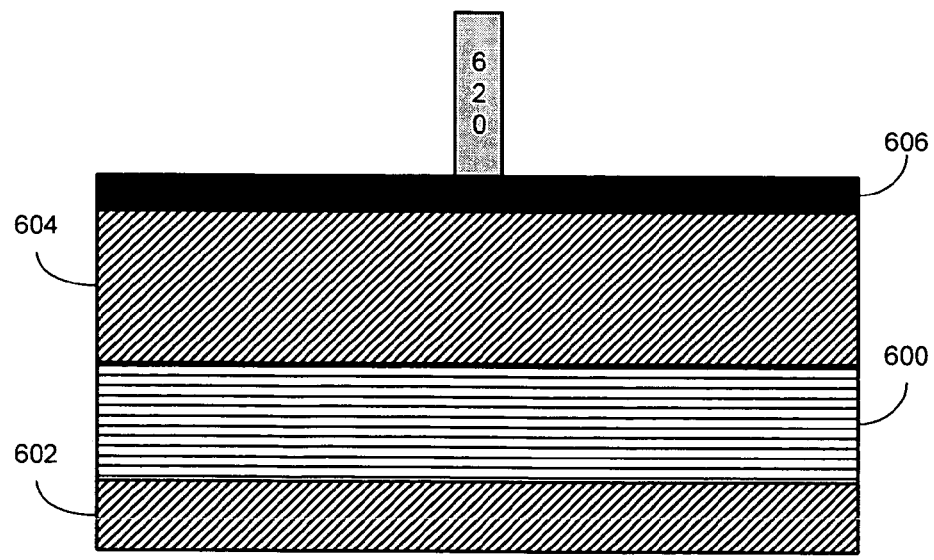

FIG. 9 shows a platable material, such as the magnetic layer 620, made of NiFe, copper (Cu), iron (Fe) or NiP, approximately 1 to 2 microns in thickness, plated partially to the top of the trench 608. It should be noted that the thickness of the layer 620 will vary depending on the plating material and width of the trench 611. Next, the plating frame layers 610 and 612 are dissolved by NMP solvent. The result is the isolated NiFe layer 620, as shown in FIG. 10 with the layers 610 and 612 having been dissolved or stripped. The thickness of the layer 620, in a way, defines the initial track width of the head.

Figure 11:
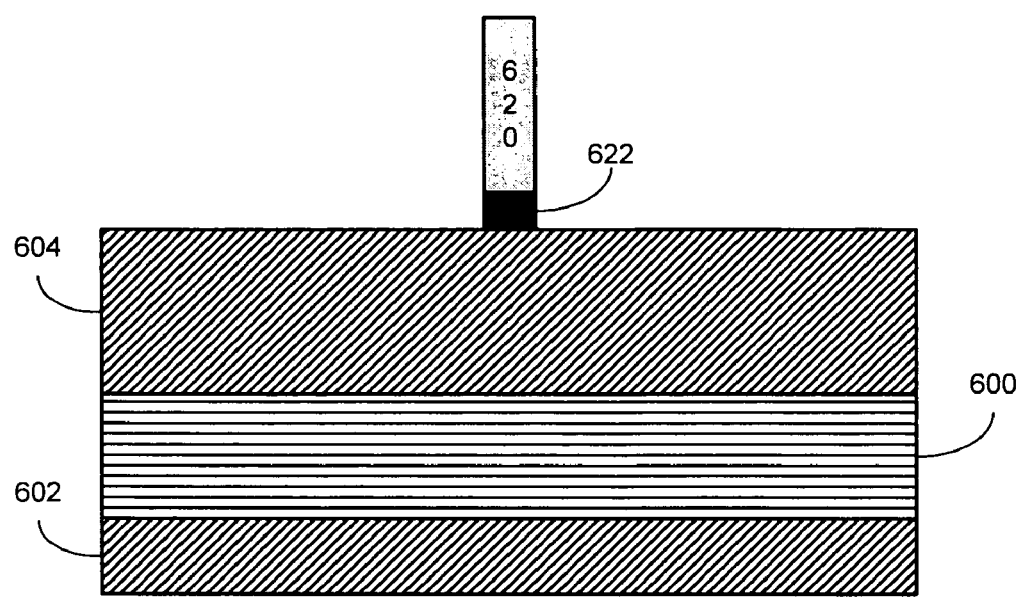

In FIG. 11, an ion milling process is performed to remove that portion of the Tantalum (Ta) Rh layer 606 that is not directly in contact with the layer 620, thus, leaving the layer 622. The process used to remove the TaRh layer is Argon (Ar)-ion bombardment, which is commonly known as ion milling. This process will reduce the thickness of the layer 620 and the layer 620 is used as a mask to leave behind the layer 622 or pattern the same.

Figure 12:
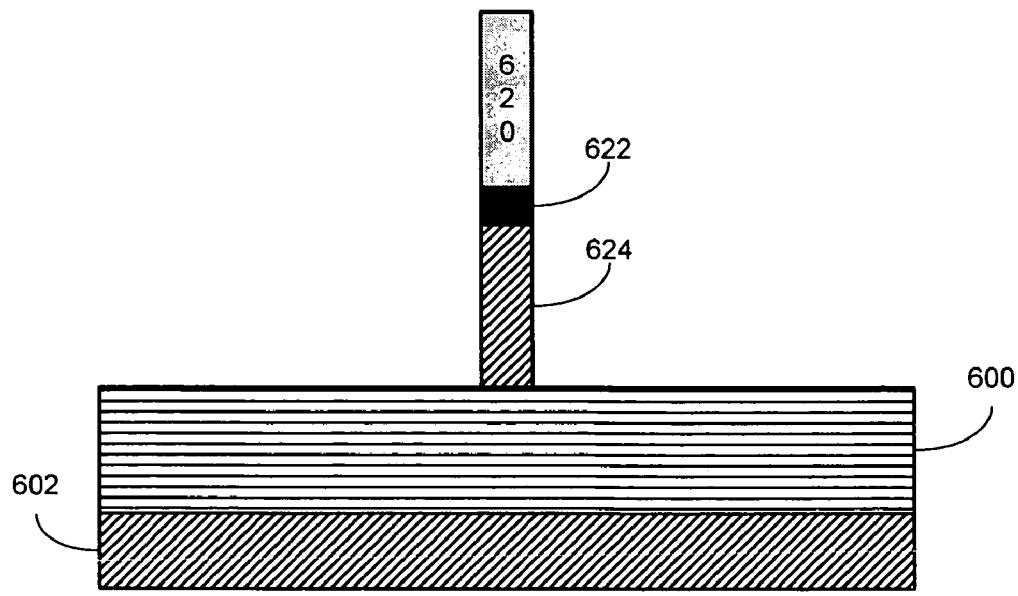

FIG. 12 shows the effect of performing a reactive ion etching or reactive ion milling operation to remove all of the layer 604 except that which is directly in contact with the layer 622, forming the layer 624. During this milling process, the laminated layer 600 is also etched, however, advantageously, the rate at which the laminated layer 600 is etched is significantly slower than the rate at which the layer 604 (alumina) is etched. This is because the reactive ion milling operation advantageously reacts much more selectively with the alumina layer 604 than with the magnetic layer 600, an exemplary ratio thereof being 10 to 1. The reactive ion milling operation is preferably performed in a $CHF_3$ and Ar mixture.

Figure 13:
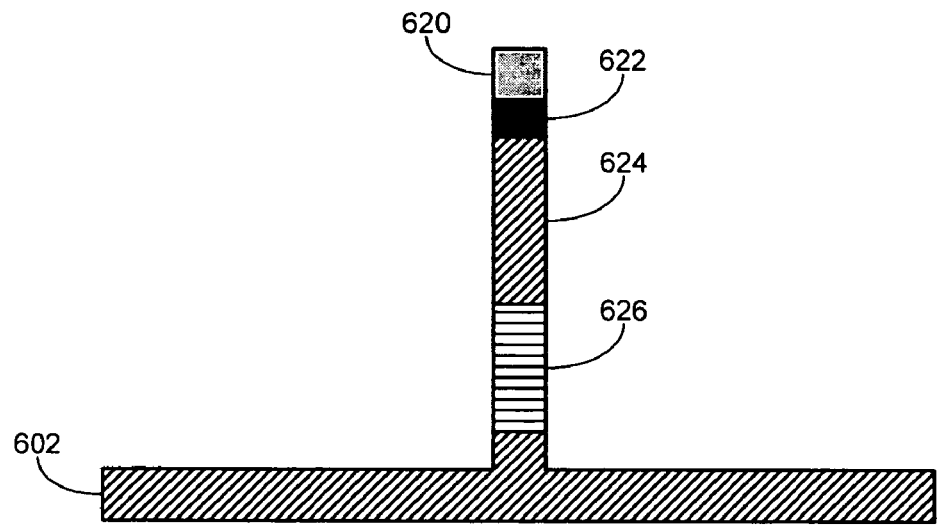

FIG. 13 shows the effect of Ar bombardment. During this process, low-angle milling is performed to pattern the layer 600 with over milling. The over milling is likely to slightly etch into the layer 602 thereby reducing the overall thickness of the layer 602. Additionally during this process, the layer 620 is consumed (or reduced in length). The resulting structure shows all of the layer 600 removed (or etched away) except the area that is directly in contact with the layer 624, the remaining area of the layer 600 forms the layer 626 in FIG. 13.

Figure 14:
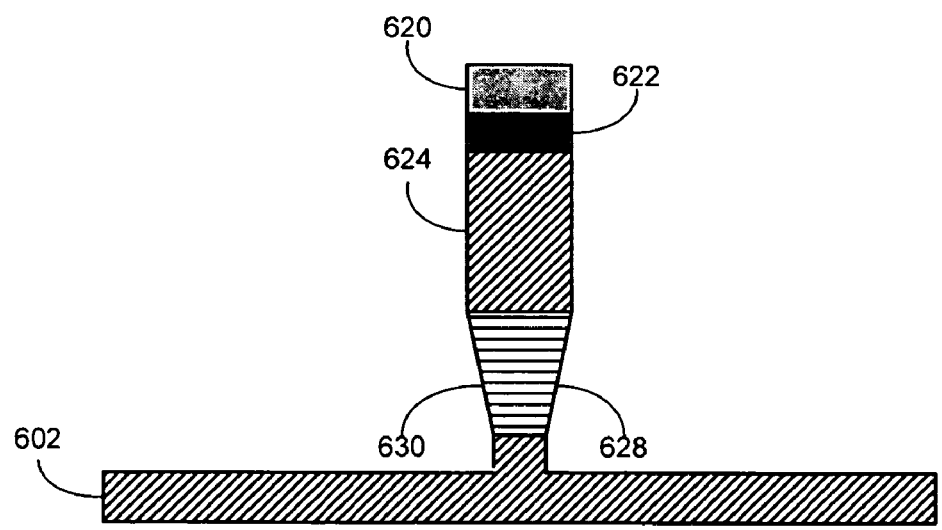

FIG. 14 shows the effect of high angle milling to shape the beveled P3 walls 628 and 630 by turning the ion beam at an angle, the milling angle being somewhere between 45 to 85 degrees. The angle of the bevel is approximately 5 to 15 degrees. The angling of the ion beam shrinks the top of the 626 layer slower than the bottom thereof, thereby, creating a bevel or angled shape. The reason for the angled affect is to avoid undesirable writing of adjacent tracks. That is, without the angled or beveled shape of the P3 region or the layer 626, if the write heads tilts even slightly during writing to the disc or medium, the adjacent track(s) may be erroneously erased, however, with the beveled shape, this problem is eliminated. The portion of the layer 602 that is in contact with the layer 626 is also beveled, as shown in FIG. 14.

Figure 15:
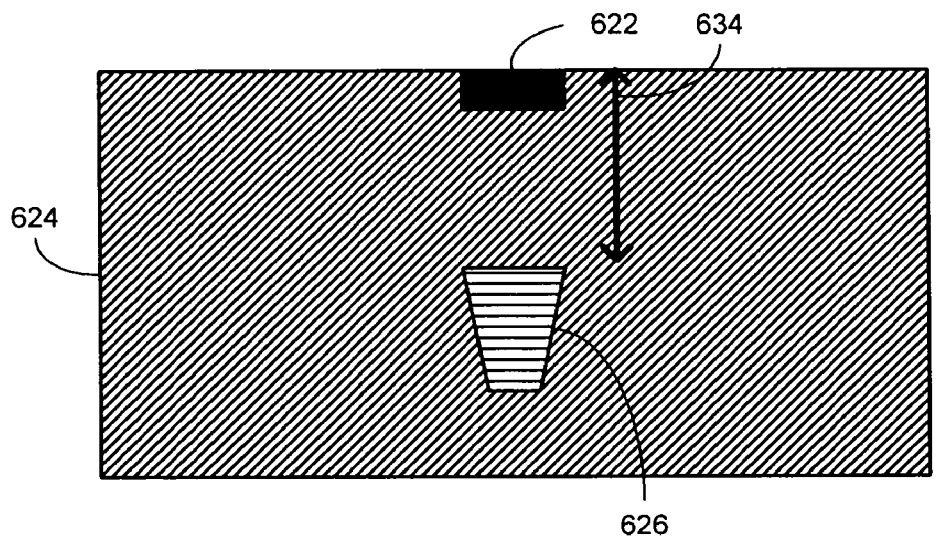

In FIG. 15, there is shown the effect of CMP (chemical milling process) to remove the layer 620, of FIG. 14, wherein the layer 622 serves as the end point for the CMP. That is, the chemical reaction, during CMP, with the layer 620 is significantly faster than the chemical reaction with the layer 622, thus, the layer 620 is removed during CMP while the layer 622 remains. The reason for this is that the chemical reaction of the CMP does not react with Rh whereas it does react with an aluminum layer. The layer 622 is alternatively referred to as the stopping layer. $Al_2O_3$ is refilled thereby filling the region shown as the layer 634 in FIG. 15. Alternatively, no CMP is performed and the layer 620 is not removed.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method for manufacturing P3 layer of a perpendicular magnetic write head comprising:
   forming a laminated layer;
   forming an alumina layer on top of the laminated layer;
   depositing a conductive layer onto the laminated layer;
   forming a plating frame made of two plating frame layers formed on top of the conductive layer, said plating frame layers being separated from each other by a trench defined by an initial track width;
   shrinking the trench;
   plating a platable material into a portion of the trench;

stripping the plating frame layers leaving the plated material;

removing the conductive layer except the conductive layer formed below the plated material defined by a first layer (622);

removing the alumina layer except the alumina layer formed below the first layer defined by a second layer (624);

while removing the alumina layer, removing the laminated layer except the laminated layer formed below the second layer; and patterning the laminated layer formed below the plated trench further patterning the removed laminated layer formed below the second layer.

2. The method for manufacturing P3 layer, as recited in claim 1, further including the step of shaping the patterned laminated layer.

3. The method for manufacturing P3 layer, as recited in claim 1, wherein the conductive layer comprises a group consisting of; Ta/Rh, Rh, Ta/Rh and Ru.

4. The method for manufacturing P3 layer, as recited in claim 1, wherein the shrinking step comprises resist shrinking process.

5. The method for manufacturing P3 layer, as recited in claim 1, further including the step of depositing Safier onto the plating frame prior to the shrinking step.

6. The method for manufacturing P3 layer, as recited in claim 5 further including the step of removing the Safier.

7. The method for manufacturing P3 layer, as recited in claim 1, wherein the platable material comprises NiFe.

8. The method for manufacturing P3 layer, as recited in claim 1, wherein the platable material is plated partially to the top of the trench.

9. The method for manufacturing P3 layer, as recited in claim 1, wherein the platable material is approximately 0.2 microns in thickness.

10. The method for manufacturing P3 layer, as recited in claim 1, wherein the alumina layer that is not removed serves as a mask to hold the dimensions of the laminated layer in place during processing thereof.

11. The method for manufacturing P3 layer, as recited in claim 1, wherein the conductive layer has a thickness within the range of 100 to 1000 Angstroms.

12. The method for manufacturing P3 layer, as recited in claim 1, wherein the laminated layer has a thickness within the range of 0.1 to 0.5 microns.

13. The method for manufacturing P3 layer, as recited in claim 1, wherein the alumina layer has a thickness within the range of 0.05 to 0.5 microns.

14. The method for manufacturing P3 layer, as recited in claim 1, wherein the alumina layer comprises Aluminum Oxide ($Al_2O_3$).

15. The method for manufacturing P3 layer, as recited in claim 1, further including the step of exposing the plating frame layers using deep ultraviolet photolithography.

16. The method for manufacturing P3 layer, as recited in claim 1, wherein the shrinking step including the step of baking thereby causing the shrinking.

17. The method for manufacturing P3 layer, as recited in claim 1, wherein depositing Safier onto the plating frame prior to the shrinking step and baking during the shrinking step and removing the Safier and further wherein the steps of depositing the Safier, baking and removing the Safier are repeated until a desired thickness of the trench is attained.

18. The method for manufacturing P3 layer, as recited in claim 1, further including removing the Safier after the shrinking step.

19. The method for manufacturing P3 layer, as recited in claim 1, further including the step of dissolving the plating frame using NMP solvent.

20. The method for manufacturing P3 layer, as recited in claim 1, wherein the removing of the alumina layer step including using a reactive ion etching process.

* * * * *